US 7,711,326 B2

(12) United States Patent
Blanc

(10) Patent No.: US 7,711,326 B2
(45) Date of Patent: May 4, 2010

(54) METHOD OF ADJUSTING THE TRANSMISSION POWER OF BASE STATIONS TRANSMITTING IN MACRO-DIVERSITY

(75) Inventor: Patrick Blanc, Issy les Moulineaux (FR)

(73) Assignee: ALCATEL, Paris (FR)

( * ) Notice: Subject to any disclaimer, the term of this patent is extended or adjusted under 35 U.S.C. 154(b) by 1194 days.

(21) Appl. No.: 09/855,499

(22) Filed: May 16, 2001

(65) Prior Publication Data

US 2002/0002057 A1 Jan. 3, 2002

(30) Foreign Application Priority Data

May 17, 2000 (FR) ................................. 00 06316

(51) Int. Cl.
*H04B 1/00* (2006.01)
(52) U.S. Cl. ........................................ 455/69; 455/524
(58) Field of Classification Search ................ 455/522, 455/69, 436, 453, 442, 422, 509, 226.1, 524, 455/552; 370/332, 342
See application file for complete search history.

(56) References Cited

U.S. PATENT DOCUMENTS

| 4,613,990 | A | | 9/1986 | Haplern | |
| 6,154,659 | A | * | 11/2000 | Jalali et al. | 455/522 |
| 6,236,865 | B1 | * | 5/2001 | Lu | 455/522 |
| 6,389,265 | B1 | * | 5/2002 | Jeschke et al. | 455/69 |
| 6,473,624 | B1 | * | 10/2002 | Corbett et al. | 455/522 |
| 6,647,005 | B1 | * | 11/2003 | Cao et al. | 370/342 |

FOREIGN PATENT DOCUMENTS

| WO | WO 99 31819 | 6/1999 |
| WO | WO 99 43100 | 8/1999 |
| WO | WO 99 52310 | 10/1999 |
| WO | WO 99/52310 | * 10/1999 |
| WO | WO 00 03480 | 6/2000 |

OTHER PUBLICATIONS

U.S. Appl. No. 09/397,076, Patrick Blanc, filed Sep. 16, 1999.
U.S. Appl. No. 09/332,942, Patrick Blanc, filed Jun. 15, 1999.
U.S. Appl. No. 09/332,939, Patrick Blanc, filed Jun. 15, 1999.

* cited by examiner

*Primary Examiner*—Tu X Nguyen
(74) *Attorney, Agent, or Firm*—Sughrue Mion, PLLC

(57) ABSTRACT

A method of adjusting transmission power for base stations transmitting in macro-diversity in a mobile radiocommunications system, wherein a reference transmission power for said adjustment is signaled to each of said base stations together with an adjustment period, and wherein each of said base stations periodically adjusts its transmission power to said reference transmission power, at said adjustment period.

7 Claims, 3 Drawing Sheets

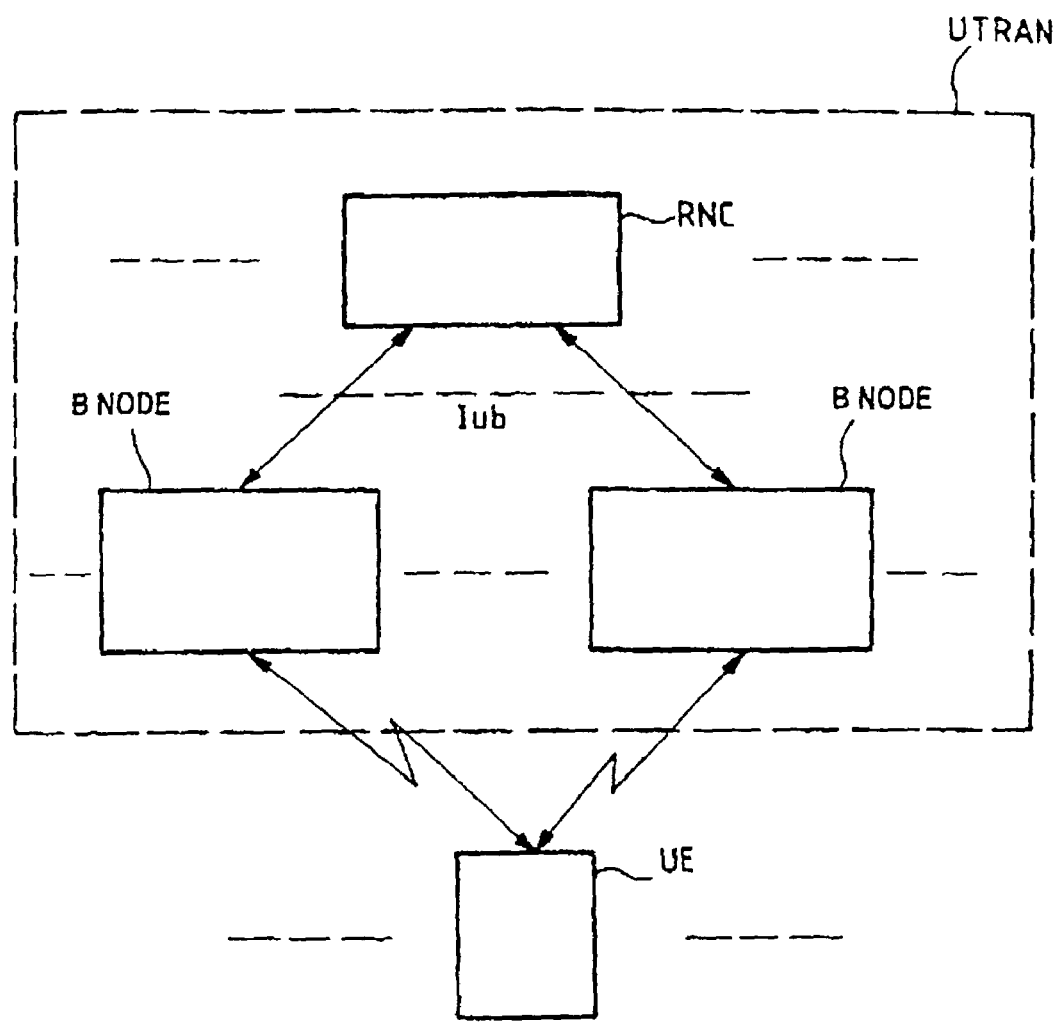
FIG_1

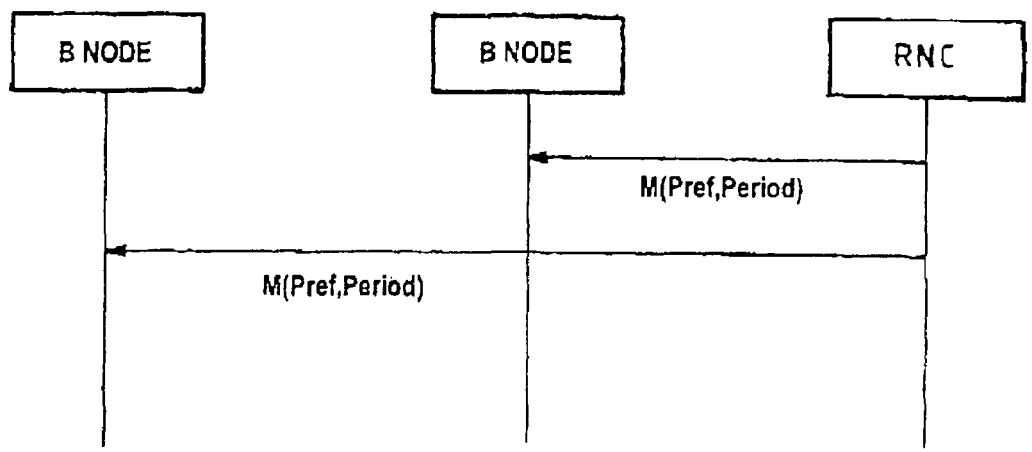
FIG_2

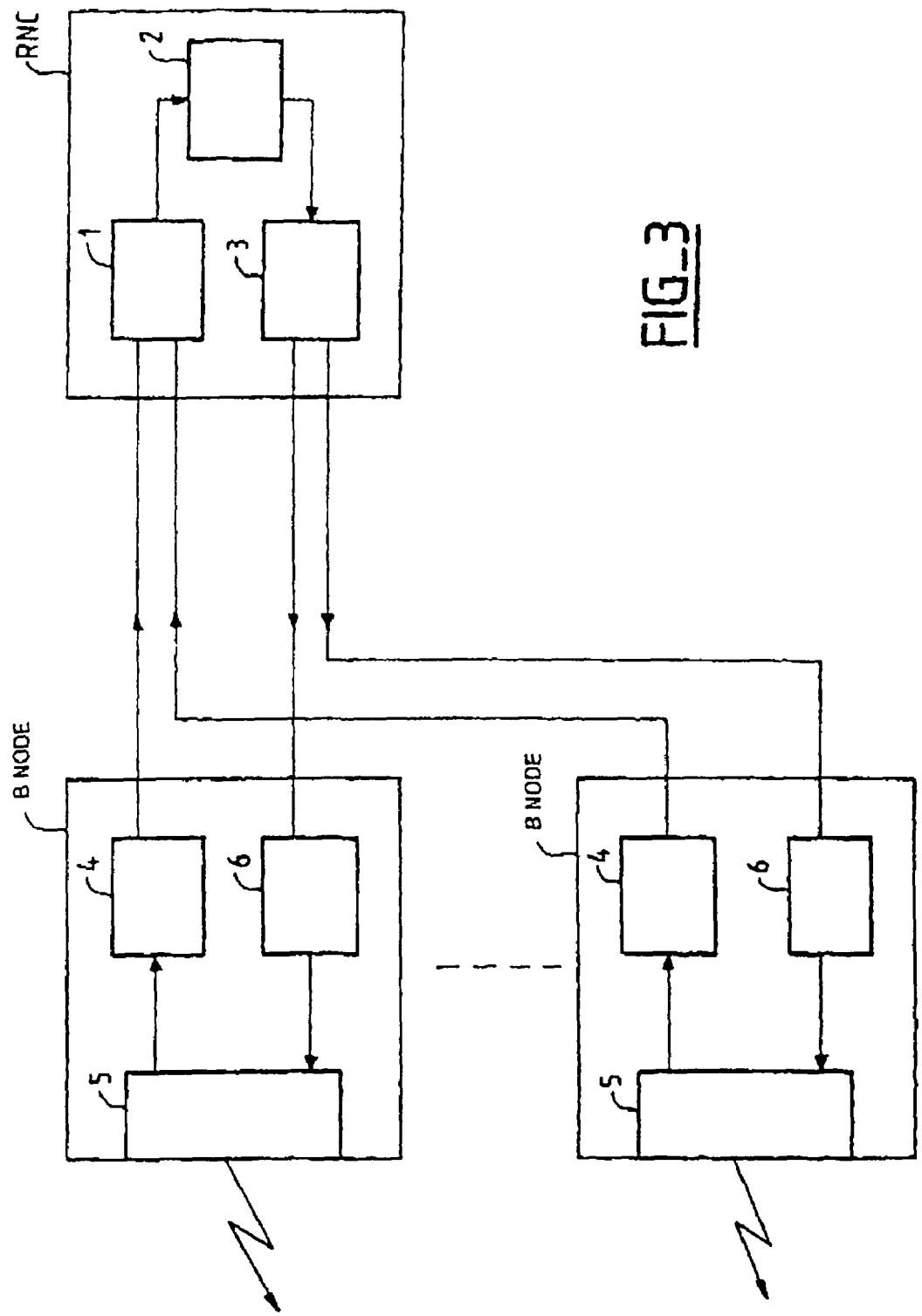
FIG_3

METHOD OF ADJUSTING THE TRANSMISSION POWER OF BASE STATIONS TRANSMITTING IN MACRO-DIVERSITY

The present invention relates in general terms to mobile radiocommunication systems, in particular systems known as code division multiple access (CDMA) systems.

BACKGROUND OF THE INVENTION

The CDMA technique is used in particular in so-called "third generation" systems, and in particular in the universal mobile telecommunication system (UMTS).

In general, in such systems, one of the objects is to increase performance, i.e., specifically, to increase capacity and/or to improve quality of service.

A commonly used technique is the technique known as Closed loop power control.

The purpose of closed loop power control is to maintain some parameter representative of the quality of transmission over a link as close as possible to a target value for each of the links between a base station and a mobile station (where said parameter can be the signal to interference ratio (SIR)). For example, in the downlink direction (i.e. from base stations to mobile stations), a mobile station transmits power control commands to a base station for the purpose of reducing the difference between the SIR as estimated by the mobile station and the target SIR value. For better effectiveness in said internal power control loop, such power control commands are transmitted quite often; by way of example, in a system such as the UMTS in which transmitted information is structured as frames, frames themselves being built up from time slots, a power control command is transmitted in each time slot. The target value can itself be determined by another control loop for maintaining a constant quality of service, said second loop generally being referred to as an "outer" loop, as compared with the preceding loop which is also referred to as an "inner" loop.

Another technique in widespread use in CDMA systems is the technique known as macro-diversity transmission or else as "soft" handover, in which a mobile station is connected simultaneously to a plurality of base stations. By using suitable techniques for processing and combining the various signals received from the various base stations by the mobile station (in particular by means of a "rake" type receiver), this makes it possible to improve performance on reception, and also to minimize the risk of a call being lost during transfers between cells, unlike the "hard" handover technique in which a mobile station is connected at any one instant to a single base station only.

In general, when using macro-diversity transmission, the inner power control loop in the downlink direction is such that the mobile station transmits the same power control command at any one instant to each of the base stations with which it is connected.

When using marco-diversity transmission, it is also known to adjust the transmission power levels of the various base stations to which a mobile station is connected relative to one another so as to optimize the performance of the system, and in particular so as to optimize its capacity. Thus, in general, a radio network controller (RNC) in the UMTS system which serves to control base stations determines the power to be used for transmission at an instant $t_{n+1}$ for each of the base stations on the basis of the transmission powers at an instant $t_n$ as reported by each of said base stations. Advantageously, the same transmission power is determined for the various base stations.

The transmission power value(s) as determined in this way (also referred to as reference transmission power(s)) are then signalled by the radio network controller to the various base stations which respond by adjusting their transmission powers on said reference transmission powers.

Furthermore, document WO 99/31819 proposes that the radio network controller informs each base station with a synchronization instant (which is the same for all base stations) simultaneously with the reference transmission power, so as to adjust transmission powers simultaneously amongst the various base stations.

An initial reference transmission power value can be determined on each occasion that one or more base stations are added or removed from the set of base stations with which a mobile station is connected, as the mobile station moves (which set is also referred to as the "active" set). Updating said reference transmission power value can then be necessary in the event of drift from the initial scheme, in particular in the event of power control command transmission errors in the inner power control loop, causing a given power control command to be transmitted no longer to all of the base stations in an active set, in which case the various transmission powers are no longer properly adjusted relative to one another.

Document WO 99/31819 also proposes informing each base station of a synchronization instant on each occasion that the reference transmission power value is updated, simultaneously with the updated reference transmission power value.

That solution suffers in particular from the drawback of significantly increasing the amount of signalling interchanged at the interface between the base stations and the radio network controller (which interface is also known as the "Iub" in UMTS), and thus to cease making effective use of the transmission resources available at said interface.

OBJECTS AND SUMMARY OF THE INVENTION

The present invention is based on a different approach, which serves in particular to avoid the above drawbacks.

In a first aspect, the present invention provides a method of adjusting transmission power for base stations transmitting in macro-diversity in a mobile radio-communications system, wherein a reference transmission power for said adjustment is signalled to each of said base stations together with an adjustment period, and wherein each of said base stations periodically adjusts its transmission power to said reference transmission power, at said adjustment period.

In other words, with the invention there is no need to signal relatively frequently updated values for the reference transmission power; it is necessary only to proceed regularly with adjustments even if they are performed on the most recently signalled value for the reference transmission power, which does not necessarily correspond to an up-to-date value. Starting from such an adjustment, the inner power control loop can then compensate relatively quickly for any differences from such an up-to-date value. Consequently, a significant saving is obtained in the quantity of signalling that is necessary, without significantly degrading performance.

Advantageously, said periodically-performed adjustments are performed at predetermined instants.

Synchronization is thus obtained for the adjustments by the various base stations without it being necessary also to transmit synchronization instants, and the resulting saving in the quantity of signalling required is correspondingly greater.

In particular, the transmitted information is structured in the form of frames that are numbered using continuously increasing numbering, said adjustment period is expressed as a number N of frames, and said predetermined instants corresponds to frames numbered n (modulo N), where $0 \leq n < N$.

Advantageously, an updated value for the adjustment period can be signalled.

Thus, the method of the invention retains the necessary flexibility, since the period of validity can be shortened or lengthened as appropriate, i.e. depending on whether adjustments need to be performed more or less frequently.

Advantageously, an updated reference transmission power value can be signalled.

The present invention also provides a radio network controller which includes, for adjusting transmission powers in base stations transmitting in macro-diversity in a mobile radiocommunications system:
 means for signalling a reference transmission power value for said adjustment to each of said base stations, together with an adjustment period.

According to another characteristic, said radio network controller includes:
 means for signalling an updated adjustment period value.

According to another characteristic, said radio network controller includes:
 means for signalling an updated reference transmission power value.

The present invention also provides a base station, said base station including, for adjusting its transmission power when transmitting in macro-diversity in a mobile radiocommunications system:
 means for receiving a reference transmission power value for said adjustment, as transmitted by a radio network controller together with an adjustment period; and
 means for periodically adjusting its transmission power to said reference transmission power value, at said adjustment period.

The present invention also provides a mobile radiocommunications system, comprising means for performing a method of the above kind.

BRIEF DESCRIPTION OF THE DRAWINGS

Other objects and characteristics of the present invention will appear on reading the following description of an embodiment given with reference to the accompanying drawings, in which;
 FIG. 1 recalls the general architecture of a mobile radio-communications system;
 FIG. 2 is a diagram for illustrating a method in accordance with the present invention; and
 FIG. 3 is a block diagram for illustrating the type of means that need to be provided in accordance with the invention in a base station (or B node in a system such as UMTS), and in a radio network controller (RNC).

MORE DETAILED DESCRIPTION

In general, and as outlined in FIG. 1, a mobile radiocommunications system comprises a radio access subsystem, itself comprising base stations (also known as "B nodes" in UMTS), and equipment for controlling the base stations (also known as radio network controllers or RNCs in UMTS). The system constituted by the B nodes and the RNC is also referred to as a UMTS terrestrial radio access network (UTRAN). The UTRAN is in communication firstly with mobile stations (also referred to as user equipment (UE) in UMTS), and secondly with a network and switching subsystem (not shown).

By way of example, FIG. 1 shows a UE appliance connected to two B nodes using the macro-diversity transmission technique. As outlined above, the powers transmitted by the various B nodes are adjusted relative to one another so as to optimize system performance, said adjustments giving rise to signalling being interchanged at the interface between the RNC and the B nodes, referenced "Iub".

An example of the method of the invention is shown in FIG. 2.

The RNC transmits a downlink-direction power control message M to each of the B nodes. This message contains, in particular, a reference power value, Pref, and an adjustment period, Period. Each B node receiving such a message periodically adjusts its transmitter power to the value given as the reference transmission power, and it does so at the indicated adjustment period.

As mentioned above, in particular in UMTS, information transmitted over the radio interface between a B node and a UE appliance is structured in frames, themselves made up of time slots. A frame lasts for 10 ms and has 15 time slots reference $IT_0$ to $IT_{14}$. Each frame has a frame number, and frames are numbered with continuously increasing numbering.

By way of example, the adjustment period is expressed as a number N of frames. For example if N is equal to 4, then adjustments are carried out once every 4 frames.

By way of example, the adjustments are performed at predetermined instants, so these predetermined instants are spaced apart by said period; for example, these adjustments are performed on each frame numbered n (modulo N), where $0 \leq n < N$. For example, if n is equal to 0, then adjustments are performed on every frame numbered 0 (modulo N).

By way of example, in each frame numbered n (modulo N), the adjustments can be performed during a predetermined time slot, e.g. time slot $IT_0$. During the following time slots $IT_1$ to $IT_{14}$, each B node applies the downlink-direction power control command as transmitted thereto by the UE, in application of the inner power control loop.

The values Pref and Period contained in a received message M are stored in each B node for use until a new update of one and/or the other of these values.

To perform such updates, the RNC relies on parameters which are reported to it by the various B nodes, for example;
 the instantaneous transmission power prior to adjustment for the current adjustment period; and/or
 the mean transmission power used during the preceding adjustment period.

The RNC can use the instantaneous transmission powers as reported to it by each B node to update the adjustment period. For example, if the differences between these instantaneous powers are high, then the RNC can reduce the period; otherwise it can increase the period.

In the example considered above, where adjustments are performed in frames numbered n (modulo N), the instantaneous transmission power before adjustment can be the instantaneous transmission power for time slot $IT_{14}$ in frame number n−1 (modulo N), for example.

The RNC can use the mean transmission powers as reported by each B node to update the reference transmission power values. For example, it can calculate the mean (or the maximum or the minimum) of said powers and it can decide to give an updated reference power value if the difference between the calculated value and the most recently signalled value is too great.

FIG. 3 is a diagram for showing an example of means that need to be provided in accordance with the invention in a base station (or B node in a system such as the UMTS), and in a radio network controller (RNC), in order to implement a method of the invention.

Thus, the RNC has:
- means 1 for receiving the transmission powers reported by the various B nodes transmitting in macro-diversity;
- means 2 for responding to the reported transmission powers to determine firstly reference transmission power values Pref for the various B nodes, and secondly an adjustment period value, Period; and
- means 3 for transmitting a downlink-direction power control message M to the various B nodes, said message containing the values Pref and Period as determined in this way.

Each B node thus comprises
- means 4 for reporting to the RNC the transmission power values as transmitted by the transmitter means 5; and
- means 6 for receiving downlink-direction power control messages from the RNC and for adjusting the transmission power of the transmitter means 5 as a function of the parameters contained in the message, applying the principles described above.

These various means can co-operate using the above-described method; the particular way in which they are implemented presents no special difficulty for the person skilled in the art, and such means do not need to be described herein in any manner more detailed than by their function.

It should also be observed that FIG. 3 is a highly diagrammatic representation of a radio network controller and the B nodes, showing only that which is necessary for understanding the present invention, and not going into detail concerning the methods or protocols used for transmission and signalling, which can rely on principles that are conventional in such systems.

In addition, examples other than those shown in the above-described figures are possible without going beyond the ambit of the present invention. In particular, in a system such as the UMTS, a B node need not communicate directly with a serving RNC (SNRC) but can communicate via another RNC, known as a "drift" RNC (DRNC). Consequently, the signalling provided by the present invention applies not only to an interface between the RNC and a B node, but also to an interface between RNCs, said interfaces being referred to respectively as Iub and as Iur in the UMTS.

The invention claimed is:

1. A method of adjusting transmission power for base stations transmitting in macro-diversity in a mobile radio-communications system, wherein a reference transmission power for said adjustment is signaled to each of said base stations together with an adjustment period, wherein each of said base stations periodically adjusts its transmission power to said reference transmission power, at said adjustment period, wherein said periodically-performed adjustments are performed at predetermined instants, and wherein the transmitted information is structured in the form of frames that are numbered using continuous increasing numbering, said adjustment period is expressed as a number N of frames, and said predetermined instants corresponds to frames numbered n (modulo N), where $0 \leq n < N$.

2. A method according to claim 1, wherein an updated value for the adjustment period can be signaled.

3. A method according to claim 1, wherein an updated reference transmission power value can be signaled.

4. A mobile radio-communications system, comprising means for performing a method according to claim 1.

5. A method according to claim 1, wherein in each frame of number n, said adjustments are performed during a predetermined time slot.

6. A base station, including, for adjusting its transmission power when transmitting in macro-diversity in a mobile radio-communications system:

means for receiving a reference transmission power value for said adjustment, as transmitted by a radio network controller together with an adjustment period; and means for periodically adjusting its transmission power to said reference transmission power value, at said adjustment period, wherein said periodically-performed adjustments are performed at predetermined instants, and wherein, the transmitted information is structured in form of frames that are numbered using continuous increasing numbering, said adjustment period is expressed as a number N of frames, and said predetermined instants corresponds to the frames numbered n (modulo N), where $0 \leq n < N$.

7. A base station according to claim 6, wherein in each frame of number n, said adjustments are performed during a predetermined time slot.

* * * * *